UNITED STATES PATENT OFFICE.

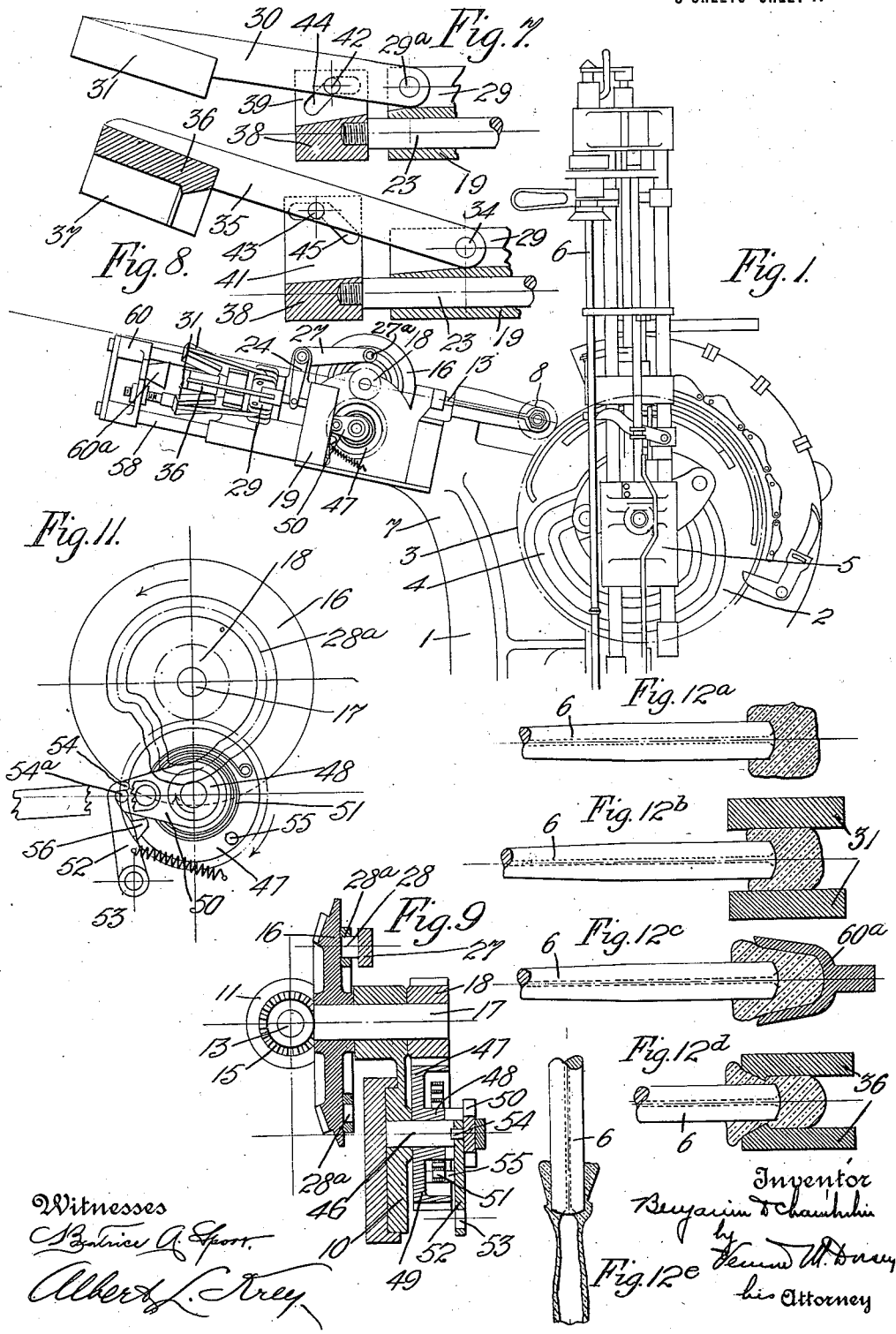

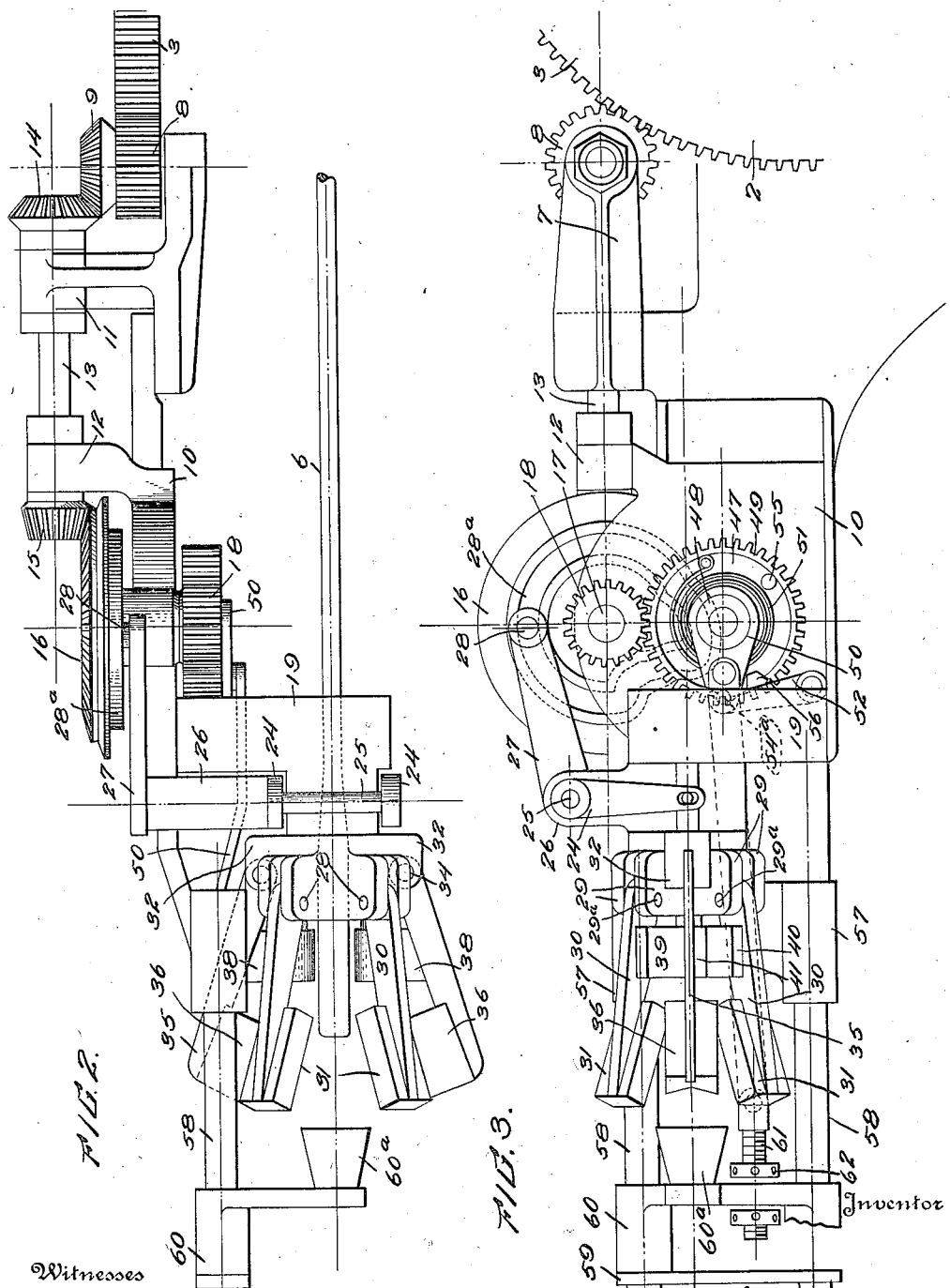

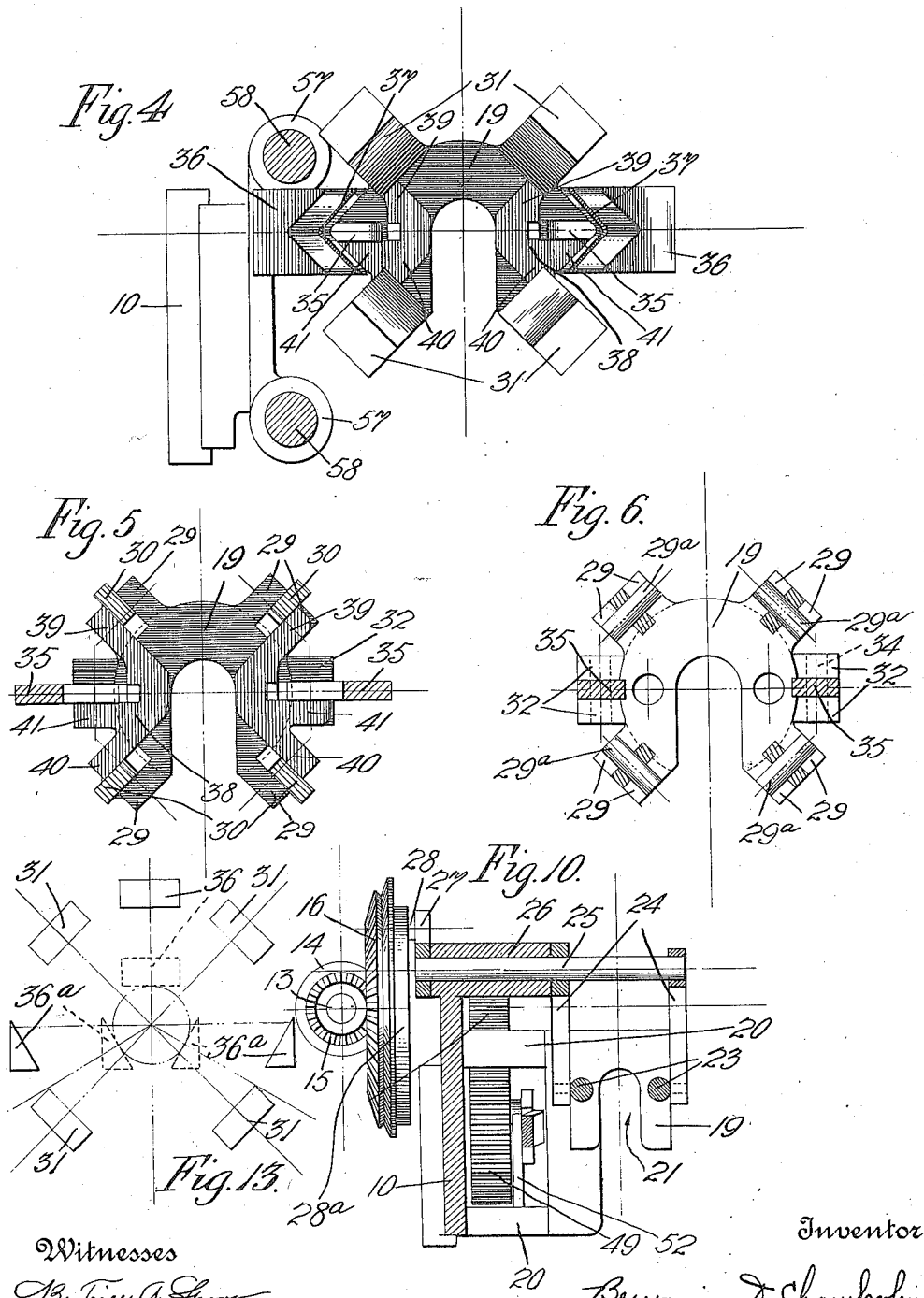

BENJAMIN DAY CHAMBERLIN, OF CORNING, NEW YORK, ASSIGNOR TO EMPIRE MACHINE COMPANY, OF PORTLAND, MAINE, A CORPORATION OF MAINE.

MACHINE FOR FORMING GLASS BLANKS.

1,148,216.

Specification of Letters Patent.

Patented July 27, 1915.

Application filed March 5, 1913. Serial No. 752,176.

*To all whom it may concern:*

Be it known that I, BENJAMIN D. CHAMBERLIN, a citizen of the United States of America, and a resident of Corning, New York, have invented certain new and useful Improvements in Machines for Forming Glass Blanks, of which the following is a specification.

In one of the processes now known for blowing glass articles in molds by machinery, the glass is gathered on a blow-iron by dipping the end of the iron in a molten glass and is, after being shaped into a solid blank by marvering, blown out, then elongated, either by gravity or centrifugal force, and then blown into a mold. Such processes demand for the production of finer ware, such as bulbs for electric lamps, uniformity in the masses and shapes of the blanks operated upon. Inasmuch as the mass of glass taken upon the iron is not susceptible of accurate regulation, I propose to obtain blanks of the desired uniformity by shaping the irregular gathers into blanks which are uniform in part at least, any excess of glass being forced from such uniform portions of the blank to positions where it will be rendered innocuous in the production of the finished article, as for instance by being forced back on the iron, and by subsequently segregating similar portions of the uniform parts of the gather from non-uniform parts thereof, preliminary to elongating such segregated uniform parts and blowing and molding the same while still on the iron. The segregation above referred to is effected by forming a groove in the blank at the desired division point, whereby the glass adjacent thereto is chilled, and whereby upon the subsequent actions the only part of the gather which flows down in the elongation is the portion beyond such divisional point.

For these purposes the embodiment of the invention here shown comprises marvering blocks mounted for movement toward the axis of the iron, a cup adapted to be projected upon the marvered gather to gage the blank and to press rearwardly on the iron, if necessary, any glass in excess of the quantity necessary to make a blank of the desired size, and grooving blocks mounted for movement toward the axis of the iron, each having thereon a ridge adapted by acting on the cupped blank to segregate a part thereof in the manner before described, with means for causing the blocks and cups to partake of the described movements in predetermined order and to predetermined extents, such mechanism being adapted to cause the cup, when projected on the blank, to be immediately retracted to prevent adhesion of the blank thereto, and the excessive cooling of the blank, the whole being adapted for use in connection with means whereby the iron is properly positioned in respect to the above referred to mechanisms, and rotated on its longitudinal axis at such time, and whereby the blow-pipe after having the gather thereon shaped and grooved is properly moved to cause an elongation of that portion of the formed blank located between the groove and the end of the blank, preparatory to blowing such portion of the blank in a mold.

Referring to the accompanying drawings in which corresponding parts are designated by corresponding marks of reference, Figure 1 is a front elevation of mechanism embodying my invention, and showing it associated with a machine to properly handle the iron. Fig. 2 is a fragmental enlarged plan view thereof. Fig. 3 is a front elevation of the parts shown in Fig. 2. Figs. 4, 5 and 6 are cross sections on lines $X^4$—$X^4$, $X^5$—$X^5$ and $X^6$—$X^6$ of Fig. 2. Figs. 7 and 8 are fragmental views, partly in section, showing the mounting of the marvering and grooving block arms, respectively. Figs. 9 and 10 are cross sections on lines $X^9$—$X^9$, and $X^{10}$—$X^{10}$ of Figs. 2 and 3. Fig. 11 is a diagrammatic view of the cup-actuating mechanism. Figs. $12^a$, $12^b$, $12^c$, $12^d$, and $12^e$ are a series of views illustrating successive actions in the shaping of the blank. Fig. 13 is a diagram representing how three grooving blocks may be employed.

Inasmuch as the invention here sought to be patented relates merely to means for properly forming and gaging a blank of glass for subsequent molding operations, the specific character of the devices with which it may be associated for the last named purposes is immaterial, but for purposes of illustration, I have in the accompanying drawings shown a frame 1 in which is mounted a cam disk 2, having crown teeth 3, and adapted in the rotation thereof to move, through its cam groove 4, a suitably pivoted frame 5, which is adapted to receive and hold a removable iron 6 upon which a mass of glass has been gathered. The disk moves the pivoted frame from a normal position in which the iron is horizontal, through a slight angular displacement to slightly lift the gather end of the pipe, and then reverse the direction of movement of the frame to position the iron vertically with the gather end down for elongation of the blank by gravity on the iron and the subsequent blowing, and then again restores the frame to its normal position as fully shown in my Patent No. 1,124,702, dated Jan. 12, 1915.

Mounted in a bracket 7 on the head of the main frame 1, is a pinion 8, meshing with and driven by the crown teeth 3, on the disk 2, the pinion 8 having fast thereto the beveled gear 9.

An extension arm 10 projects from the bracket 7 and is adjustable thereon, radially in respect to the axis of the pivoted frame, and a line slightly rising from the horizontal, and in a bearing 11 on the bracket 7 and, in a bearing 12 on the extension arm is mounted a shaft 13, having on its inner end a beveled pinion 14, meshing with the beveled gear 9, and on its outer end a beveled gear 15, driving a beveled gear wheel 16 fast on the rear end of a cross shaft 17 mounted in bearings in the extension arm 10, the front end of such shaft having fast thereon in front of such arm a pinion 18. The shaft 13 is telescopic to permit adjustment of the arm 10 on the bracket.

A casting 19 is carried on the forward face of the arm 10, outside of the shaft 17, by top and bottom spacing blocks 20. This casting has an open slot 21 in the bottom thereof located in the plane of movement of the iron 6 carried in the pivoted frame 4, and which is adapted when the gather end of the iron is lifted up to receive a part thereof adjacent to such gather end. A rod 23 is mounted to slide in the casting 19 on each side of the slot therein, each of such rods being connected to a crank arm 24 fixed upon the forward end of a shaft 25, carried in a bearing 26 on the extension arm 10, the shaft 25 having fixedly mounted upon the rear end thereof a third arm 27, having on the outer end thereof a wrist pin 28, taking into a cam groove 28ᵃ on the forward face of the wheel 16, whereby the rods 23 will be reciprocated in the casting 19 by the rotation of the said wheel.

The outer end of the casting is rounded and has on the outer surface thereof four pairs of radial ears 29, each pair of ears forming between them a radial slot in which is pivoted by a transverse pin 29ᵃ, the inner end of a lever 30, on the outer end of which is mounted a marvering block 31. At diametrical opposite points on the casting are also formed two pairs of ears 32, 32, each pair forming between them a radial slot, in which is pivoted by a transverse pin 34, the inner end of a lever 35, the outer end of which carries a block 36. The blocks 36 have recesses in the working faces thereof V-shaped in cross section, with the open end of the V disposed inwardly and the apex outwardly, in respect to the axis of the open slot 21 in the casing and each block, moreover, has a shoulder 37 crossing the V groove, and at right angles thereto.

Each rod 23 carries on its outer end a head 38, substantially of the shape shown in Figs. 2, 3 and 5, that is to say having ears 39, 40 and 41 thereon, the ears 39 and 40 being situated when the parts are assembled adjacent to two of the levers 30, while the ear 41 is adjacent to a lever 35, to which levers the said ears are connected, respectively, by studs 42, and 43, respectively, which studs are fast to the levers and pass through curved slots in the ears. The slots 44 in the ears 39 and 40 have their outer ends converging toward and their inner ends parallel with, the axis of the slot 21 in the casting 19 (see Fig. 7), while the slots 45 in the ears 41 are reversed, having their inner ends converging toward and their outer ends parallel with such axis. By this construction it will be seen that as the shaft 25 is oscillated by the wheel 16 and the rods 23 moved inwardly and outwardly in their guides in the casting 19, such outward movement of the rods and of the heads 38 carried thereby, will, by means of the inclined portions of the slots 45 and studs 43 move the V blocks on the outer ends of the levers 35 outwardly in respect to the axial line of the open slot in the casting, and will then by means of the slots 44 and studs 42 move the marvering plate 31 on the outer ends of the levers 30 inwardly toward the axis of the open slot in the casting, and that upon the inward movement of the rod 23 the levers will be reversed in their movement.

A stub bearing 46 projects from the forward face of the extension arm 10 below the shaft 17, and has mounted thereon a disk 47, provided with a forwardly projecting hub 48, and an annular rim 49, which is toothed and which is engaged by the pinion 18 on the shaft 17. An arm 50 is journaled on the forward end of the stub bearing, and has connected to it one end of a spiral spring 51, contained in the recess formed in the face of the disk between the hub and the rim thereof, the other end of the spring being connected to the disk, so that the rotation of the disk will tend, through the spring, to turn the arm in the direction of the arrow, Fig. 10, the arm being normally restrained from such rotation by a spring latch 52, pivoted at 53, and having a nose 54, adapted to engage a pin 54ᵃ projecting rearwardly from the rear face of the outer end of the arm. This latch is, however, at each revolution of the disk 47 thrown to release the arm, by a pin 55 on the disk, which strikes a projection 56 on the latch for this purpose. When so released, the arm is, by the tension which has been placed upon the spiral spring by the revolution of the disk while the arm is held against movement, rapidly thrown through nearly a full rotation, when by its high angular velocity it comes into contact with the rear side of the pin 55, on the disk, with which it then moves until such pin has released the latch, and until it again is arrested by the nose 54 of the latch, upon the return of the latter to normal position.

The outer end of the extension arm 10 has two tubular sockets 57, in which are mounted extension rods 58, connected at their outer end, by a cross bar 59. Guided on the rods 58 is the sliding frame 60, which has projecting forwardly therefrom a hollow block or cup 60$^a$ located in the axis of the blow-pipe receiving slot of the casting 19, and of a proper size and shape to effect the operation hereinafter set forth. A rod 61 is connected between the sliding frame and with the arm 50, and serves to effect a full reciprocation of the former on each full rotation of the latter, the rod being adjustably connected with the frame, as at 62, to permit adjustments of the inner limit of movement of the cup.

Presuming that the parts above described in detail be assembled upon a machine, such for instance that of my prior application, adapted to present a blow-pipe thereto on the rotation of the main disk, or its equivalent, the operation is as follows:—A workman effects a gather of glass upon an iron by inserting the latter in molten glass, and having placed such iron in the pivoted frame 5, starts the action of the machine. The rotation of the disk 2 lifts the gather end of the iron, having thereon a gather of glass somewhat of the shape shown in Fig. 12$^a$, and the iron through the open bottom of the slot in the casting 19, and maintains it stationary in that position during further rotation of the disk and during the functioning of the coöperating mechanism herein shown, the blow-pipe being meanwhile rotated about its longitudinal axis. The rotation of the disk during the movement of the blow-pipe before described effects rotation of cam disk 16, and of the disk 47. The shape of the cam seen in the former is such that when the iron comes to rest after being lifted, the crank shaft 25 is given angular movement in such direction as to cause the marvering blocks 31 to move inwardly toward the axis of the blow-pipe to the position relative thereto shown in Fig. 12$^b$. As there shown, the blocks in such position tend to force the gather into a solid blank in the form of a cylinder. The continued rotation of the disk 16 then reverses the angular movement of the crank shaft 25, and causes an outward movement of the marverer blocks 31. During the periods above referred to the rotation of the disk 47 has been flexing the spring 51, and as soon as the marverer plates 31 have moved sufficiently away from the blow-pipe to clear the member 60$^a$ the striker pin 55 on such disk will press back the latch 52, releasing the arm 50, and permitting it to make nearly a complete rotation under the driving power of the spring 51. In so doing, the arm will draw the sliding frame inwardly, and then instantly again throw it outwardly. As the inward throw of the cup caused by the movement of the sliding frame is definitely determined, and as the distribution of glass resulting from the action of the marverer plates 31 is such as to form a blank sufficient to, or greater than is necessary to, fill the cup when so thrown to this limited extent, the cup will in its inward movement be forced over the blank, as shown in Fig. 12$^c$, and will, by forcing the blank rearwardly on the iron to a greater or less extent, result in the formation of a blank, of which the part which has been inclosed in the cup, is of definite volume and occupies a definite position in respect to the coöperating mechanisms, and it will be seen that the cupped portions of the successive blank so formed will be uniform in size and position. When the outward movement of the cup has been effected by the return of the arm 50 to normal position, the disk 16 will give continued and further angular movement to the crank shaft 25, whereby the V blocks 36 will be moved inwardly toward the axis of the blow-pipe, as shown in Fig. 12$^d$. In so doing, the rounded top cone resulting from the action of the cup will be worked outwardly into a cylinder, of the proper form and distribution to be afterward elongated and blown out into the desired article. In so doing the shoulders upon the V blocks will form grooves in the blank at a point, which is preferably in the cupped portion thereof, and at the part thereof that surrounds the end of the iron, thus marking off a part of the cupped portion of the blank. Inasmuch as the grooves will be identically located in the successive uniform blanks, it follows that the actions before described result in forming blanks which beyond the grooves therein will be similar. After the V blocks have performed their function as above set forth, the disk 16 will reverse the angular motion of the crank shaft 25, and the blocks will be moved away from the axis of the blow-pipe. The further rotation of the main disk will now move the blow-pipe frame to lower the formed blank for elongation, and molding, and will result in the admission of air into the formed blank prior to the elongation to form a cavity therein. The elongation of the now hollow blank will take place below the groove formed in the blank (see Fig. 12ᵉ), for the action of grooving shoulders on the V blocks produces a localized chilling of the glass at such point, which segregates the blank below the grooves from the glass above it during the elongation, and thus the successive actions of the machines result in the elongation of uniform and similar glass masses which is essential to automatic blowing and molding.

In the rotation of the main disk to effect various actions subsequent to the operations performed upon the blank by the shaping mechanisms before described, it may be that the marvering and grooving blocks will repeat their circle of operations, but inasmuch as no blow-pipe will at such times be in operative relation with an iron, this, while unproductive, is not a defect, but in such case, the gear ratio between the main disk and the cam disk 16 should be whole numbers, whereby the several parts will have similar relations to each other at the initiation of each operation. As shown the disk 16 will rotate twice for rotation of the main disk, while due to the relative sizes of the pinion 18, and the disk 47, the latter will be synchronized in angular speed with the main disk.

It will be noted that inasmuch as I have shown four sets of marvering blocks 31 which move in paths intersecting at the axial centers of the iron, and which are spaced at equal angular distances from each other, this provides a balancing of the pressures on the gather, and centers the latter against movement out of the proper axial central position, whereby the diameter of the gather resulting from a definite and predetermined inward movement of the marvering blocks 31, is determined. This result, however, would be accomplished by any movement of blocks, more than two, spaced around the center, even though they be not altogether symmetrically spaced, as the position of any three points will determine the circle intersecting them. I prefer the use of four blocks as giving better balancing condition of pressure on the gather. I have in Figs. 1, 2, 3, 4, 5 and 6 shown but two blocks 36, and for this reason have grooved such blocks to prevent the displacement of the gather in respect thereto, but even with such movement of grooved blocks, it will be seen that there are more than two points of contact with the gather, namely, there are two contact points for each block, and hence in this case, also the gather is in balanced condition by a more than two point support. If desired, however, three grooving blocks may be used as shown in Fig. 13. In this figure the block 36 is of the previous construction, while the blocks 36ᵃ are spaced to contact (as shown dotted) with the gather at substantially equal angular distances from each other and from the block 36 and the faces of the several blocks 36 and 36ᵃ are all tangents to their contact points, with the gather, whereby the pressures on the gatherer are balanced. As for constructional reasons it is not convenient to place the pivots for the three grooving blocks equi-distant, when the four blocks 31 are used, this results in the faces of the blocks 36ᵃ being oblique to the paths of movement of such blocks, but inasmuch as that small change in diameter of the blank is effected by the grooving blocks, this is not disadvantageous.

I do not in this application claim any process or method herein shown, as claims thereon have, under either the requirements of the Patent Office been removed herefrom and form the subject-matter of my application filed April 21, 1913, serially numbered 762,559, or form the subject-matter of my other application filed February 1, 1912, serially numbered 674,814. Nor do I herein broadly claim mechanism for sizing a plastic blank by the inclusion thereof within a gage mold, as such claims form the subject-matter of my other application filed January 4, 1915, serially numbered 504, as division of the application upon which my said Patent Number 1,124,702 issued. Furthermore, I do not claim in this application matter shown and described in my prior application #491,812, filed on April 23, 1909, or application No. 551,198, filed March 23, 1910, or divisions thereof, as such matter will be claimed therein.

Having thus described my invention, what I claim and desire to secure by Letters Patent is:—

1. In a machine of the class described, the combination with means for forming a blank of definite size, of means for forming a groove in the blank at a definite point from the end thereof, and means for presenting the glass so grooved for elongation.

2. In a machine for preparing blanks for blowing and molding, the combination with means for forming from a mass of glass on an iron a blank of definite and predetermined size and shape, of means for locally chilling the shaped blank at a definite point from the end thereof to segregate the flow of one portion of such blank from another portion thereof.

3. In a machine for preparing blanks for blowing and molding, the combination with shaping means adapted to form from an irregular gather on a blow pipe a blank of uniform size and shape, of a grooving device adapted to groove such formed blank at a definite predetermined point, and means for bringing the shaping means and grooving device into action, successively.

4. In a machine for preparing blanks for blowing and molding, the combination with a marverer, and means to bring it into contact with a mass of glass on a blow-pipe, of a gage cup, a grooving device, and means for successively moving the marverer, the cup and the grooving device into predetermined definite positions in respect to the mass of glass.

5. In a machine of the character described, the combination with a marverer for a mass of glass, of a gage cup, means for projecting the same upon the marvered glass, and a grooving device, and means for bringing it into contact with the cupped glass at a definite and predetermined distance from the end thereof.

6. The combination with an iron having a gather of glass thereon, of a plurality of marverer blocks and a plurality of grooving blocks mounted for movement toward the axis of the iron, a gage cup mounted for movement axially of the iron, and means for causing predetermined movements of the marverer block, the cup and the grooving blocks toward the iron, in the order named.

7. The combination with a receiver for iron having a gather of glass thereon, of a plurality of marvering blocks, and a plurality of grooving blocks, the latter having transverse shoulder thereon, pivoted concentrically to the iron, of means for alternately and predeterminedly moving the marvering and the grooving blocks toward and away from the axis of the iron, a cup, and means for projecting the cup upon the glass, upon the iron between the action of the several sets of blocks thereon, and for rapidly withdrawing it therefrom.

8. The combination with a marverer comprising more than two members, each of which is movable to and from the others during the marvering, and means for moving the several members to predetermined extent.

9. In a machine for forming glass blanks, the combination with a marvering device comprising more than two members movable in intersecting planes, of means for moving the members simultaneously and equally toward the point of intersection of the several planes during the marvering, and means for positioning a gather of glass at the point of intersection of the several planes.

10. In a device for forming glass blanks, the combination with a marverer comprising more than two members moving in different paths at an angle to each other, and means for moving the several parts in such paths to cause a decrease in the diameter of a circle inscribed within them to a predetermined extent during the marvering.

11. In a machine for forming glass blanks, the combination with a marverer comprising more than two pivoted members moving in planes symmetrically located in respect to each other, means for moving the members toward a common center during the marvering, and means for positioning a blow-pipe at the common center by movement in a plane inclined at an angle to the planes of movement of two of the members.

12. In a glass-forming machine, the combination with a support, of a plurality of marvering blocks pivoted therein around the center of the support for movement toward such common center, and a second set of blocks also pivoted in the support for movement in planes other than the planes of movement of the first set of blocks, and means for successively actuating the several sets of blocks.

13. In a machine for preparing blanks for blowing and molding, the combination with means for forming from a mass of glass on an iron a blank of definite and predetermined size and shape, and means for segregating one portion of such blank for elongation.

14. In a machine for forming glass blanks, the combination with a marvering device comprising more than two members movable in different planes, of means for positioning a gather of glass in respect thereto, and means for bringing the said members in contact with the said glass at substantially equidistant points therearound.

In testimony whereof I hereunto affix my signature in the presence of two witnesses.

BENJAMIN DAY CHAMBERLIN.

Witnesses:
DELPHINE KEAGLE,
G. WILLIS DRAKE.